United States Patent
Wu et al.

(10) Patent No.: US 11,993,304 B2
(45) Date of Patent: May 28, 2024

(54) ELECTRICALLY ADJUSTABLE STEERING COLUMN AND ELECTRIC POWER STEERING SYSTEM

(71) Applicant: Steering Solutions IP Holding Corporation, Saginaw, MI (US)

(72) Inventors: Yihong Wu, Suzhou (CN); Hongbing Zhang, Suzhou (CN); Shenbing Wen, Suzhou (CN); Wei Wang, Suzhou (CN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/095,932

(22) Filed: Jan. 11, 2023

(65) Prior Publication Data

US 2023/0257017 A1    Aug. 17, 2023

(30) Foreign Application Priority Data

Jan. 12, 2022 (CN) .......................... 202210029945.0

(51) Int. Cl.
*B62D 1/19* (2006.01)
*B62D 1/181* (2006.01)
*B62D 1/185* (2006.01)

(52) U.S. Cl.
CPC .............. *B62D 1/195* (2013.01); *B62D 1/181* (2013.01); *B62D 1/185* (2013.01)

(58) Field of Classification Search
CPC ........ B62D 1/195; B62D 1/181; B62D 1/185; B62D 1/192; Y02E 10/50
See application file for complete search history.

(56) References Cited

U.S. PATENT DOCUMENTS

2022/0396302 A1* 12/2022 Shiroishi ................ B62D 1/192

FOREIGN PATENT DOCUMENTS

CN      106184339 A  * 12/2016  ............. B62D 1/192
CN      104843050 B  *  8/2017
(Continued)

*Primary Examiner* — Drew J Brown
(74) *Attorney, Agent, or Firm* — Dickinson Wright PLLC (57) ABSTRACT

The present disclosure relates to the technical field of vehicle steering, and provides an electrically adjustable steering column and an electric power steering system. The electrically adjustable steering column includes: a telescopic component including a first steering shaft and a first protective jacket sleeved on the first steering shaft; a drive component including a drive bracket disposed on an outer wall of the first protective jacket, wherein a main body of the drive bracket is provided with a first energy absorption slot extending in an axial direction; an energy absorption component including a first bolt passing through the first energy absorption slot and extending into the first protective jacket, wherein the first bolt is fixedly connected to the first protective jacket and in a sliding fit with the first energy absorption slot; when in a use stage, the first bolt is maintained at a head end of the first energy absorption slot, and the drive component is capable of driving the telescopic component to expand and contract through the drive bracket; when in a collapse and energy absorption stage, the telescopic component collapses and drives at least the first bolt to slide in the first energy absorption slot. The present disclosure realizes a maintaining function during telescopic adjustment and an energy absorbing function during collision and collapse mainly by the bolt, thereby simplifying the structure and reducing the cost.

8 Claims, 8 Drawing Sheets

(56) References Cited

FOREIGN PATENT DOCUMENTS

| | | | | | |
|---|---|---|---|---|---|
| CN | 108995705 | A | * | 12/2018 | ............. B62D 1/195 |
| CN | 110997451 | A | * | 4/2020 | ............. B62D 1/181 |
| CN | 113454350 | A | * | 9/2021 | ............. B62D 1/181 |
| EP | 3015341 | A1 | * | 5/2016 | ............. B62D 1/195 |
| JP | 2005075250 | A | * | 3/2005 | ............. B62D 1/195 |
| KR | 20070023334 | A | * | 2/2007 | |

* cited by examiner

ELECTRICALLY ADJUSTABLE STEERING COLUMN AND ELECTRIC POWER STEERING SYSTEM

CROSS REFERENCE TO RELATED APPLICATIONS

This application claims priority to Chinese Application No. 202210029945.0 filed on Jan. 12, 2022, the contents of which are incorporated herein by reference.

TECHNICAL FIELD

The present disclosure relates to the technical field of vehicle steering, in particular to an electrically adjustable steering column and an electric power steering system.

BACKGROUND

A steering column is part of a vehicle's electric power steering system that connects a steering wheel and an intermediate shaft to help the vehicle turn. When a collision happens to the vehicle, a driver will move forward under inertia, resulting in body parts like chest violently collided with the steering wheel. In order to reduce the injury to the driver, collapse and energy absorption need to be considered in structural design of the steering column.

Figure 1:
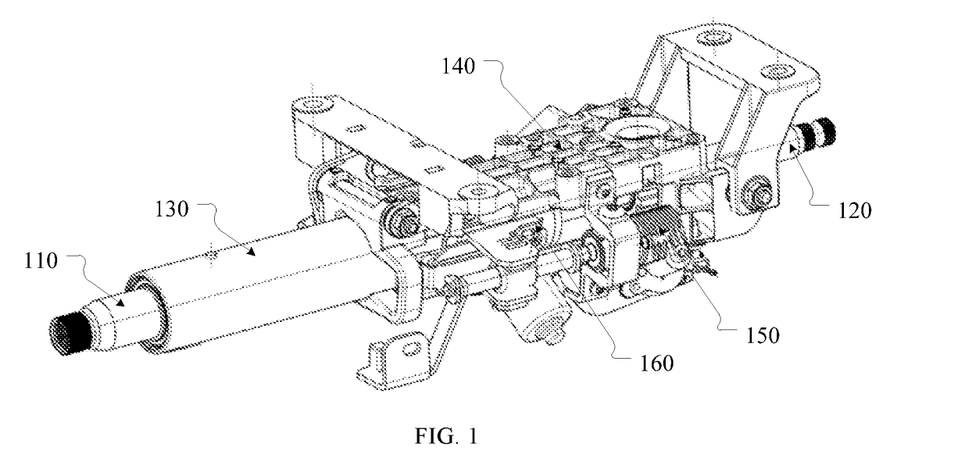
FIG. 1 is a schematic view showing a structure of a steering column in the prior art.

FIG. 1 shows a structure of an existing steering column. The steering column is electrically adjustable and includes an upper steering shaft 110 connected to the steering wheel and a lower steering shaft 120 connected to the intermediate shaft. Outside the upper steering shaft 110 is sleeved with an upper protective jacket 130 and outside the lower steering shaft 120 is provided with a lower protective jacket 140. Driven by a driving device 150, the upper steering shaft 110 and the upper protective jacket 130 can expand and contract with respect to the lower steering shaft 120 and the lower protective jacket 140.

The existing steering column absorbs energy mainly through a steel belt 160. Specifically, a drive motor of the driving device 150 is connected to the lower protective jacket 140, and a drive shaft of the drive motor is connected to the upper protective jacket 130 through the specially designed steel belt 160 and some support structures. In a normal state, the steel belt 160 keeps a prototype and the driving device 150 can drive the upper steering shaft 110 and the upper protective jacket 130 to expand and contract. When a collision occurs, collision force will be transmitted to the upper steering shaft 110 through the steering wheel, thereby the upper steering shaft 110 and the upper protective jacket 130 collapse and the steel belt 160 deforms to absorb collision energy. In addition, the steel belt 160 needs to be equipped with a retainer to restrain the deformation of the steel belt 160.

The existing design of using the steel belt 160 to absorb energy will lead to a complex structure and high costs of the steering column, which is not pragmatic.

It should be noted that information disclosed in the background above is intended only to enhance understanding of the background of the present disclosure and may therefore include information that does not well known to those of ordinary skill in the art.

SUMMARY

The present disclosure provides an electrically adjustable steering column and an electric power steering system. The electrically adjustable steering column realizes a maintaining function during telescopic adjustment and an energy absorbing function during collision and collapse mainly by cooperation of bolts and a drive bracket, thereby simplifying a structure and reducing costs of the electrically adjustable steering column.

An aspect of the present disclosure provides an electrically adjustable steering column, including: a telescopic component including a first steering shaft and a first protective jacket sleeved on the first steering shaft; a drive component including a drive bracket disposed on an outer wall of the first protective jacket, wherein a main body of the drive bracket is provided with a first energy absorption slot extending in an axial direction; an energy absorption component including a first bolt passing through the first energy absorption slot and extending into the first protective jacket, wherein the first bolt is fixedly connected to the first protective jacket and in a sliding fit with the first energy absorption slot; when in a use stage, the first bolt is maintained at a head end of the first energy absorption slot, and the drive component is capable of driving the telescopic component to expand and contract through the drive bracket; when in a collapse and energy absorption stage, the telescopic component collapses and drives at least the first bolt to slide in the first energy absorption slot.

In some embodiments, an end face of the head end of the first energy absorption slot is provided with a first clamping protrusion protruding radially outward; in the use stage, a fastening end face of the first bolt is pressed against the first clamping protrusion; in a release stage of the collapse and energy absorption stage, the telescopic component drives the fastening end face of the first bolt to break away from the first clamping protrusion, and in an energy absorption stage of the collapse and energy absorption stage, the telescopic component drives the first bolt to slide in the first energy absorption slot.

In some embodiments, a friction plate is provided between the fastening end face of the first bolt and the drive bracket, and the friction plate is fixedly connected to the first bolt and in a sliding fit with the drive bracket; in the use stage, the first bolt is pressed against the head end of the first energy absorption slot through the friction plate; in the collapse and energy absorption stage, the first bolt drives the friction plate to slide relative to the drive bracket.

In some embodiments, the friction plate is provided with a boss clamped to the first energy absorption slot, wherein an outer surface of the friction plate is coated with an electrophoretic coating, and the friction plate is tightened to the drive bracket through two first bolts.

In some embodiments, a maximum sliding stroke of the first bolt is equal to a length of the first energy absorption slot in the axial direction; the first bolt and the first energy absorption slot are in an interference fit.

In some embodiments, a second energy absorption slot extending in the axial direction is provided at a tail end of the drive bracket; the energy absorption component further includes: a second bolt passing through the second energy absorption slot and extending into the first protective jacket, wherein the second bolt is fixedly connected to the first protective jacket and in a sliding fit with the second energy absorption slot; in the use stage, the second bolt is maintained at a head end of the second energy absorption slot; in the collapse and energy absorption stage, the telescopic component further drives the second bolt to slip out of the second energy absorption slot.

In some embodiments, an end face of the head end of the second energy absorption slot is provided with a second clamping protrusion protruding radially outward; in the use stage, a fastening end face of the second bolt is pressed against the second clamping protrusion; in a release stage of the collapse and energy absorption stage, the telescopic component drives the fastening end face of the second bolt to break away from the second clamping protrusion, and in an energy absorption stage of the collapse and energy absorption stage, the telescopic component drives the second bolt to slip out of the second energy absorption slot.

In some embodiments, the electrically adjustable steering column further includes: hollow rivets connected between the drive bracket and the first protective jacket; in a release stage of the collapse and energy absorption stage, the telescopic component drives the hollow rivets to be broken.

In some embodiments, the electrically adjustable steering column further includes: a second steering shaft, wherein a tail end of the first steering shaft is slidably sleeved on a head end of the second steering shaft; a second protective jacket provided outside the second steering shaft; wherein a drive motor of the drive component is connected to the second protective jacket, and the drive motor is connected to the drive bracket through a drive shaft.

Another aspect of the present disclosure provides an electric power steering system including the electrically adjustable steering column described in any of the above embodiments.

Compared with the prior art, the present disclosure has at least following beneficial effects.

The energy absorption component of the electrically adjustable steering column of the present disclosure is mainly realized by bolts. Through cooperation of the bolts and energy absorption slots of the drive bracket, the energy absorption component can play a maintaining role in the use stage to maintain the steering column stable, and enable the drive component to drive the telescopic component to expand and contract through the drive bracket; in the collapse and energy absorption stage, the energy absorption component can play an energy absorbing role to absorb collision energy to ensure safety when the telescopic component collapses. In addition, the electrically adjustable steering column has a simple structure and low costs.

It should be understood that general description above and detailed description in the following are only illustrative and exemplary, which do not limit the present disclosure.

BRIEF DESCRIPTION OF THE DRAWINGS

The drawings herein are incorporated into and form part of the specification, which show embodiments conforming to the present disclosure, and are used together with the specification to explain the principle of the present disclosure. Obviously, the drawings described in the following show only some embodiments of the present disclosure. For those of ordinary skill in the art, other drawings can be obtained on the basis of these drawings without creative work.

DETAILED DESCRIPTION

Exemplary embodiments will now be described comprehensively with reference to the drawings. The exemplary embodiments can be implemented in various forms, which should not be understood to be limited to the embodiments described herein. Rather, these embodiments provided herein make the present disclosure comprehensive and complete, and fully communicate concepts of the present disclosure to technicians in the field.

The drawings are schematic views of the present disclosure only and are not necessarily drawn in proportion. Same marks in the drawings represent the same or similar parts, thereby repeated description of them will be omitted. Terms used in specific description like "first", "second" do not indicate any order, quantity and importance, but only distinguish different components. It should be noted that in the cases of non-conflict, embodiments of the present disclosure and features in different embodiments can be combined with each other.

Figure 2:
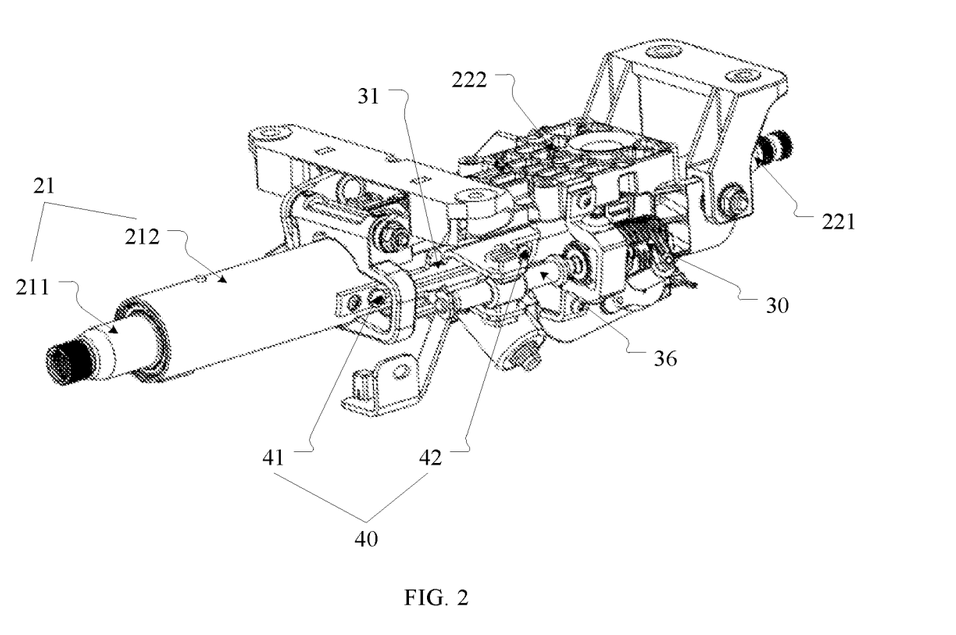
FIG. 2 is a schematic view showing a structure of an electrically adjustable steering column in an embodiment of the present disclosure.
Figure 3:
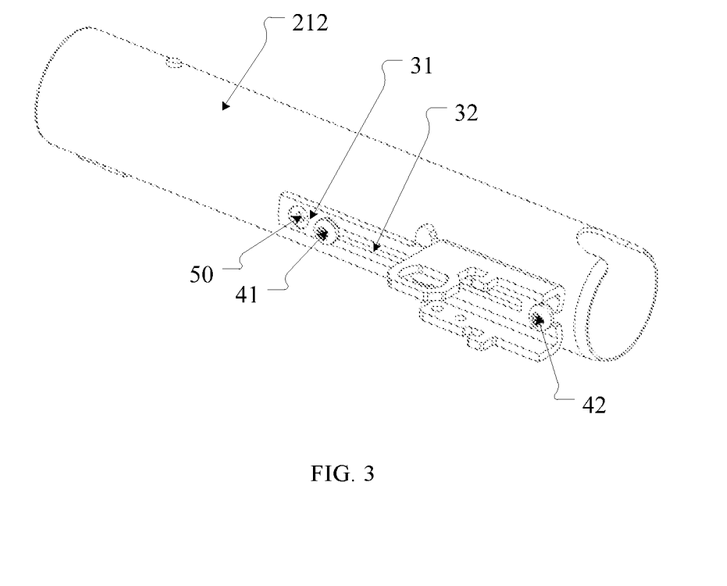
FIG. 3 is a schematic view showing a structure in a use stage of an energy absorption component of the electrically adjustable steering column shown in FIG. 2.
Figure 4:
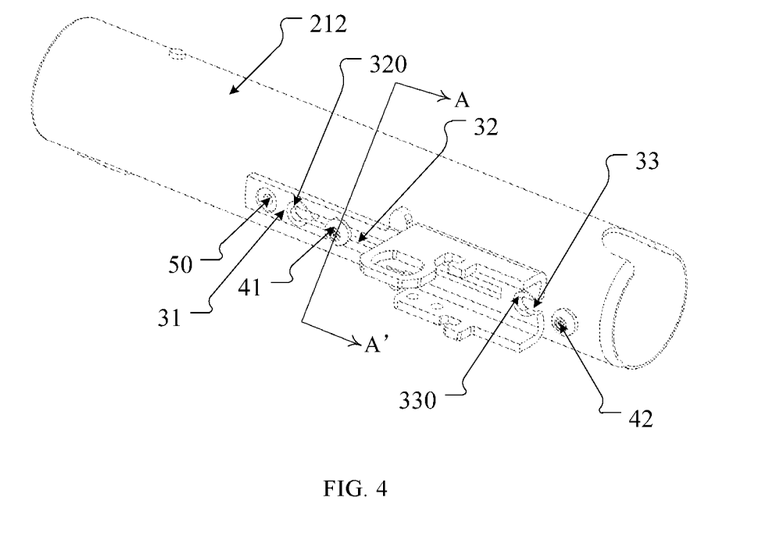
FIG. 4 is a schematic view showing a structure in a collapse and energy absorption stage of the energy absorption component of the electrically adjustable steering column shown in FIG. 2.
Figure 5:
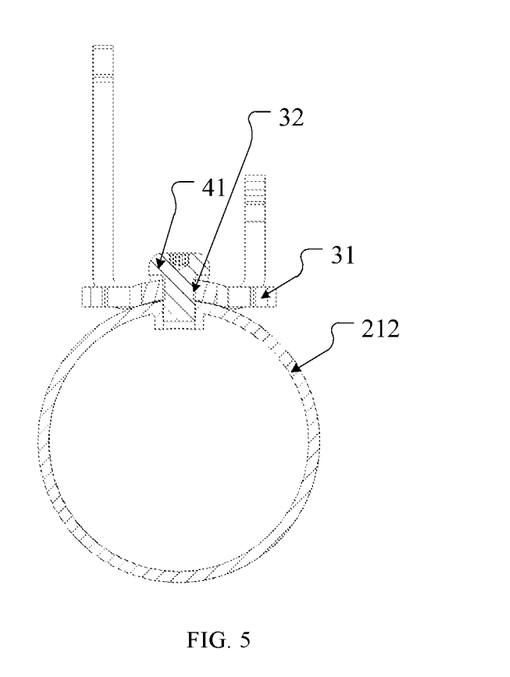
FIG. 5 is a sectional view along a A-A' section line shown in FIG. 4.

FIG. 2 shows a structure of an electrically adjustable steering column in an embodiment, FIG. 3 shows a structure in a use stage of an energy absorption component of the electrically adjustable steering column, FIG. 4 shows a structure in a collapse and energy absorption stage of the energy absorption component of the electrically adjustable steering column, FIG. 5 shows a section structure along a A-A' section line shown in FIG. 4; referring to FIG. 2 to FIG. 5, the electrically adjustable steering column in this embodiment includes the following components.

A telescopic component 21, includes a first steering shaft 211 and a first protective jacket 212 sleeved on the first steering shaft 211. The first steering shaft 211 is used to connect with a steering wheel. The first protective jacket 212 and the first steering shaft 211 can be connected specifically by bearings.

A drive component 30, includes a drive bracket 31 disposed on an outer wall of the first protective jacket 212, wherein a main body of the drive bracket 31 is provided with a first energy absorption slot 32 extending in an axial direction. The axial direction refers to an axial direction of the first steering shaft 211, i.e., an axial direction of the electrically adjustable steering column.

In addition, the electrically adjustable steering column further includes: a second steering shaft 221, wherein a tail end of the first steering shaft 211 is slidably and coaxially sleeved on a head end of the second steering shaft 221; and a second protective jacket 222 provided outside the second steering shaft 221. Wherein, the head end refers to an end close to the steering wheel, and the tail end refers to an end away from the steering wheel. The second protective jacket 222 can be fixedly connected to vehicle brackets. Further, a drive motor of the drive component 30 is connected with the second protective jacket 222, and the drive motor is connected with the drive bracket 31 through a drive shaft 36.

An energy absorption component 40, includes a first bolt 41 passing through the first energy absorption slot 32 and extending into the first protective jacket 212, wherein the first bolt 41 is fixedly connected to the first protective jacket 212 and in a sliding fit with the first energy absorption slot 32. The first bolt 41 and the first protective jacket 212 can be fixed by screw connection.

In the use stage, the first bolt 41 is maintained at a head end of the first energy absorption slot 32, and the drive component 30 is capable of driving the telescopic component 21 to expand and contract through the drive bracket 31. In the normal use stage, the energy absorption component 40 plays a maintaining role, which can overbear a load in a preset range to ensure the steering column stable. At this time, the drive component 30 is capable of driving the telescopic component 21 to expand and contract through the fixedly maintained drive bracket 31 to adjust positions of the steering wheel.

In the collapse and energy absorption stage, the telescopic component 21 collapses and drives at least the first bolt 41 to slide in the first energy absorption slot 32. In the collapse and energy absorption stage, the telescopic component 21 collapses due to violent collision from the steering wheel, a collision force is greater than a maintaining force of the energy absorption component 40, thereby driven by the first protective jacket 212, the first bolt 41 slides in the first energy absorption slot 32 to absorb collision energy.

A maximum sliding stroke of the first bolt 41 is equal to a length of the first energy absorption slot 32 in the axial direction, which consequently plays a deformation constraint role to the collapse of the steering column. The length of the first energy absorption slot 32 can be designed as needed. According to different vehicles, different lengths can be adapted to ensure that not only the deformation constraint role is effective but also that most of the collision energy can be absorbed through sufficient sliding friction stroke.

In addition, the first bolt 41 and the first energy absorption slot 32 are in an interference fit, and a specific interference amount can be set as needed to ensure that enough sliding friction can be generated to absorb the collision energy when the first bolt 41 slides in the first energy absorption slot 32.

In an embodiment, an end face of the head end of the first energy absorption slot 32 is provided with a first clamping protrusion 320 protruding radially outward; in the use stage, a fastening end face of the first bolt 41 is pressed against the first clamping protrusion 320; in a release stage of the collapse and energy absorption stage, the telescopic component 21 drives the fastening end face of the first bolt 41 to break away from the first clamping protrusion 320, and in an energy absorption stage of the collapse and energy absorption stage, the telescopic component 21 drives the first bolt 41 to slide in the first energy absorption slot 32. That is, the collapse and energy absorption stage includes the release stage and the energy absorption stage. The release stage is realized at least through the friction between the first bolt 41 and the first clamping protrusion 320, and the energy absorption stage is mainly realized through the interference fit between the first bolt 41 and the first energy absorption slot 32.

In the normal use stage, cooperation of a torque of the first bolt 41 and a protrusion degree of the first clamping protrusion 320 can ensure that the first bolt 41 and drive bracket 31 maintain fixed, the steering column maintains stable, and the drive component 30 is capable of driving the telescopic component 21 to expand and contract through the fixedly maintained drive bracket 31. In the collapse and energy absorption stage, the collision force is greater than a release force between the first bolt 41 and the first clamping protrusion 320, so that driven by the first protective jacket 212, the first bolt 41 breaks away from the first clamping protrusion 320 and slides in the first energy absorption slot 32 to absorb the collision energy.

Figure 6:
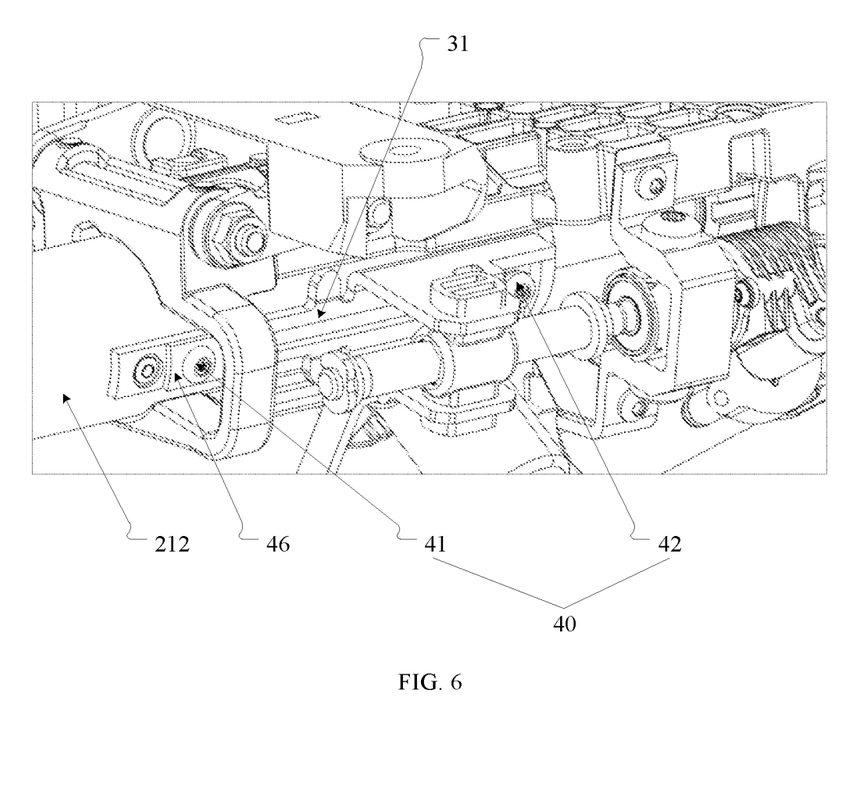
FIG. 6 is a schematic view showing a local structure of the electrically adjustable steering column in another embodiment of the present disclosure.
Figure 7:
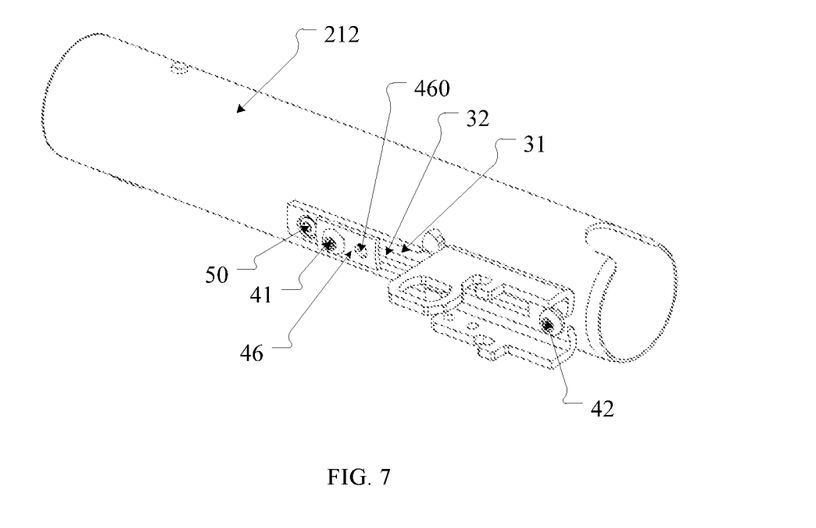
FIG. 7 is a schematic view showing a structure in the use stage of the energy absorption component of the electrically adjustable steering column shown in FIG. 6.
Figure 8:
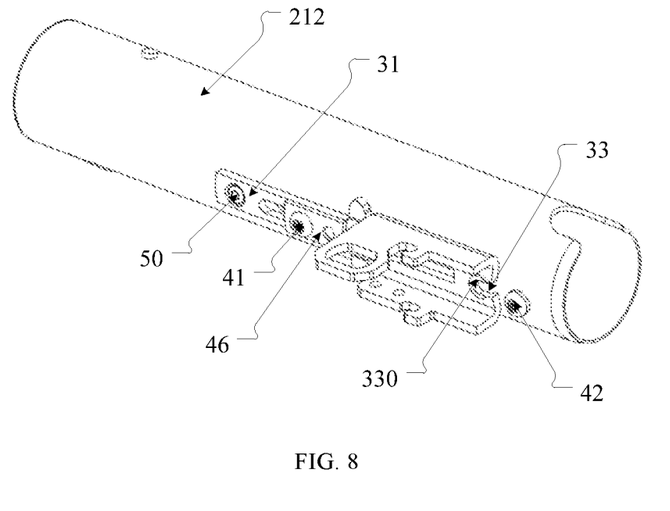
FIG. 8 is a schematic view showing a structure in the collapse and energy absorption stage of the energy absorption component of the electrically adjustable steering column shown in FIG. 6.

FIG. 6 shows a local structure of the electrically adjustable steering column in another embodiment, FIG. 7 shows a structure in the use stage of the energy absorption component of the electrically adjustable steering column shown in FIG. 6, FIG. 8 shows a structure in the collapse and energy absorption stage of the energy absorption component of the electrically adjustable steering column shown in FIG. 6. The electrically adjustable steering column shown in FIG. 6 to FIG. 8 differs from the electrically adjustable steering column shown in FIG. 2 to FIG. 5 in the following aspects.

The end face of the first energy absorption slot 32 is not provided with the first clamping protrusion 320, instead, the pressure between the first bolt 41 and the drive bracket 31 is realized by a friction plate 46. Specifically, the friction plate 46 is provided between the fastening end face of the first bolt 41 and the drive bracket 31, and the friction plate 46 is fixedly connected to the first bolt 41 and in a sliding fit with the drive bracket 31; in the use stage, the first bolt 41 is pressed against the head end of the first energy absorption slot 32 through the friction plate 46; in the collapse and energy absorption stage, the first bolt 41 drives the friction plate 46 to slide relative to the drive bracket 31.

Through the friction plate 46 between the first bolt 41 and the drive bracket 31, in the normal use stage, the first bolt 41 and the drive bracket 31 maintain fixed, the steering column maintains stable, and the drive component 30 is capable of driving the telescopic component 21 to expand and contract through the fixedly maintained drive bracket 31; in the collapse and energy absorption stage, the collision force is greater than the maintaining force provided by the friction plate 46, so that driven by the first protective jacket 212, the first bolt 41 slides in the first energy absorption slot 32 and drives the friction plate 46 to slide relative to the drive bracket 31 to absorb the collision energy.

In one embodiment, the friction plate 46 is provided with a boss 460 clamped to the first energy absorption slot 32. The boss 460 can prevent the friction plate 46 from rotating around the first bolt 41, thereby ensuring that a contact area between the friction plate 46 and the drive bracket 31 does not change greatly during the collision process and the energy absorption capacity maintains stable.

In one embodiment, an outer surface of the friction plate 46 is coated with an electrophoretic coating to control a roughness of the friction plate 46 within a reasonable range and to reduce a friction coefficient of the friction plate 46 to avoid affecting the torque of the first bolt 41. The electrophoretic coating can choose appropriate electrophoretic paint materials as needed.

In one embodiment, the friction plate 46 can be tightened to the drive bracket 31 through two first bolts 41 to ensure a solid connection of the friction plate 46.

Further, referring to FIG. 3, FIG. 4, FIG. 7 and FIG. 8, in some embodiments, a tail end of the drive bracket 31 is further provided with a second energy absorption slot 33 extending in the axial direction; the energy absorption component 40 further includes: a second bolt 42 passing through the second energy absorption slot 33 and extending into the first protective jacket 212, wherein the second bolt 42 is fixedly connected to the first protective jacket 212 and in a sliding fit with the second energy absorption slot 33. In the use stage, the second bolt 42 is maintained at a head end of the second energy absorption slot 33; in the collapse and energy absorption stage, the telescopic component 21 further drives the second bolt 42 to slip out of the second energy absorption slot 33.

The second energy absorption slot 33 is short, which mainly cooperates with the second bolt 42 to play the maintaining role, and of course enhances the energy absorption effect. Specifically, in the normal use stage, the first bolt 41 is maintained at the head end of the first energy absorption slot 31, far away from a telescopic fulcrum; if the telescopic adjustment process only relies on the maintaining force of the first bolt 41, the telescopic adjustment will be unstable and result in the first protective jacket 212 upwarp relative to the second protective jacket 222, which will attenuate the torque of the first bolt 41. Therefore, in this embodiment, the cooperation of the second bolt 42 and the second energy absorption slot 33 is added at the tail end of the drive bracket 31, which improves the smoothness and the stability of the telescopic adjustment, enables both the head end and the tail end of the drive bracket 31 to be fixedly maintained in the normal use stage, and furthermore enhances the energy absorption effect of the energy absorption component 40.

In one embodiment, an end face of the head end of the second energy absorption slot 33 is provided with a second clamping protrusion 330 protruding radially outward; in the use stage, a fastening end face of the second bolt 42 is pressed against the second clamping protrusion 330; in the release stage of the collapse and energy absorption stage, the telescopic component 21 drives the fastening end face of the second bolt 42 to break away from the second clamping protrusion 330, and in the energy absorption stage of the collapse and energy absorption stage, the telescopic component 21 drives the second bolt 42 to slip out of the second energy absorption slot 33. Similarly to the first clamping protrusion 320, the second clamping protrusion 330 can ensure that in the normal use stage, the second bolt 42 and the drive bracket 31 maintain fixed, the steering column maintains stable, and the drive component 30 is capable of driving the telescopic component 21 to expand and contract through the fixedly maintained drive bracket 31; in the collapse and energy absorption stage, the collision force is greater than the release force between the second bolt 42 and the second clamping bulge 330, so that driven by the first protective jacket 212, the second bolt 42 breaks away from the second clamping protrusion 330 and further slips out of the second energy absorption slot 33, the sliding friction between the second bolt 42 and the second energy absorption slot 33 will absorb part of the collision energy.

Therefore, in this embodiment, the release stage can be realized through the friction between the first bolt 41 and the first clamping protrusion 320, as well as the friction between the second bolt 42 and the second clamping protrusion 330; the energy absorption stage is mainly realized through the interference fit between the first bolt 41 and the first energy absorption slot 32, supplemented by a short-distance interference fit between the second bolt 42 and the second energy absorption slot 33.

In addition, referring to FIG. 3, FIG. 4, FIG. 7 and FIG. 8, the electrically adjustable steering column further includes hollow rivets 50 connected between the drive bracket 31 and the first protective jacket 212; in the release stage of the collapse and energy absorption stage, the telescopic component 21 drives the hollow rivets 50 to be broken. The hollow rivets 50 can be provided in appropriate positions between the drive bracket 31 and the first protective jacket 212 as needed, and number of the hollow rivets 50 can be adjusted as needed, which are not limited to the figures. In the normal use stage, the hollow rivets 50 play a certain maintaining role; and in the collapse and energy absorption stage, the hollow rivets 50 break, so that the first protective jacket 212 and the drive bracket 31 can move relatively.

Therefore, in this embodiment, the break of the hollow rivets 50, the friction between the first bolt 41 and the first clamping protrusion 320, and the friction between the second bolt 42 and the second clamping protrusion 330 realize the release stage together; and the energy absorption stage is mainly realized through the interference fit between the first bolt 41 and the first energy absorption slot 32, supplemented by the short-distance interference fit between the second bolt 42 and the second energy absorption slot 33.

In conclusion, the energy absorption component of the electrically adjustable steering column of the present disclosure is mainly realized by bolts. Through the cooperation of the bolts and the energy absorption slots of the drive bracket, the energy absorption component can play the maintaining role in the use stage to maintain the steering column stable, and enable the drive component to drive the telescopic component to expand and contract through the drive bracket, so as to adjust positions of the steering wheel. In the collapse and energy absorption stage, the energy absorption component plays the energy absorbing role, sliding in the energy absorption slot with the collapse of the telescopic component, to absorb the collision energy and ensure safety. Through experimental testing, the energy absorption component of the present disclosure can realize good maintaining and energy absorbing effect. Furthermore, the electrically adjustable steering column has a simple structure and low costs.

Embodiments of the present disclosure also provide an electric power steering system including the electrically adjustable steering column described in any of the above embodiments. Through the electrically adjustable steering column, in the normal use stage, the electric power steering system can maintain a stable structure and can adjust positions of the steering wheel as needed; in the collapse and energy absorption stage, the electric power steering system can absorb the collision energy with the collapse of the steering column to ensure safety; and the electric power steering system can simplify the structure and reduce costs.

The above content is a further detailed description of the present disclosure in combination with specific preferred embodiments and it cannot be assumed that the specific embodiments of the present disclosure are limited to these descriptions. For those of ordinary skill in the art to which the present disclosure belongs, any simple deduction or substitution made without being separated from the conception of the present disclosure shall be regarded as belonging to the protection scope of the present disclosure.

What is claimed is:
1. An electrically adjustable steering column, comprising:
a telescopic component comprising a first steering shaft and a first protective jacket sleeved on the first steering shaft;
a drive component comprising a drive bracket disposed on an outer wall of the first protective jacket, wherein a main body of the drive bracket is provided with a first energy absorption slot extending in an axial direction;

an energy absorption component comprising a first bolt passing through the first energy absorption slot and extending into the first protective jacket, wherein the first bolt is fixedly connected to the first protective jacket and in a sliding fit with the first energy absorption slot;

when in a use stage, the first bolt is maintained at a head end of the first energy absorption slot, and the drive component is capable of driving the telescopic component to expand and contract through the drive bracket;

when in a collapse and energy absorption stage, the telescopic component collapses and drives at least the first bolt to slide in the first energy absorption slot;

a friction plate is provided between a fastening end face of the first bolt and the drive bracket, and the friction plate is fixedly connected to the first bolt and in a sliding fit with the drive bracket;

in the use stage, the first bolt is pressed against the head end of the first energy absorption slot through the friction plate; and in the collapse and energy absorption stage, the first bolt drives the friction plate to slide relative to the drive bracket, wherein the friction plate is provided with a boss clamped to the first energy absorption slot, and an outer surface of the friction plate is coated with an electrophoretic coating.

2. The electrically adjustable steering column according to claim 1, wherein an end face of the head end of the first energy absorption slot is provided with a first clamping protrusion protruding radially outward;

in the use stage, the fastening end face of the first bolt is pressed against the first clamping protrusion;

in a release stage of the collapse and energy absorption stage, the telescopic component drives the fastening end face of the first bolt to break away from the first clamping protrusion, and in an energy absorption stage of the collapse and energy absorption stage, the telescopic component drives the first bolt to slide in the first energy absorption slot.

3. The electrically adjustable steering column according to claim 1, wherein a maximum sliding stroke of the first bolt is equal to a length of the first energy absorption slot in the axial direction;

the first bolt and the first energy absorption slot are in an interference fit.

4. The electrically adjustable steering column of claim 1 further comprising:

hollow rivets connected between the drive bracket and the first protective jacket;

in a release stage of the collapse and energy absorption stage, the telescopic component drives the hollow rivets to be broken.

5. An electrically adjustable steering column, comprising:

a telescopic component comprising a first steering shaft and a first protective jacket sleeved on the first steering shaft;

a drive component comprising a drive bracket disposed on an outer wall of the first protective jacket, wherein a main body of the drive bracket is provided with a first energy absorption slot extending in an axial direction;

an energy absorption component comprising a first bolt passing through the first energy absorption slot and extending into the first protective jacket, wherein the first bolt is fixedly connected to the first protective jacket and in a sliding fit with the first energy absorption slot;

when in a use stage, the first bolt is maintained at a head end of the first energy absorption slot, and the drive component is capable of driving the telescopic component to expand and contract through the drive bracket;

when in a collapse and energy absorption stage, the telescopic component collapses and drives at least the first bolt to slide in the first energy absorption slot; and wherein a second energy absorption slot extending in the axial direction is provided at a tail end of the drive bracket;

the energy absorption component further comprises:

a second bolt passing through the second energy absorption slot and extending into the first protective jacket, wherein the second bolt is fixedly connected to the first protective jacket and in a sliding fit with the second energy absorption slot;

in the use stage, the second bolt is maintained at a head end of the second energy absorption slot;

in the collapse and energy absorption stage, the telescopic component further drives the second bolt to slip out of the second energy absorption slot.

6. The electrically adjustable steering column according to claim 5, wherein an end face of the head end of the second energy absorption slot is provided with a second clamping protrusion protruding radially outward;

in the use stage, a fastening end face of the second bolt is pressed against the second clamping protrusion;

in a release stage of the collapse and energy absorption stage, the telescopic component drives the fastening end face of the second bolt to break away from the second clamping protrusion, and in an energy absorption stage of the collapse and energy absorption stage, the telescopic component drives the second bolt to slip out of the second energy absorption slot.

7. An electrically adjustable steering column, comprising:

a telescopic component comprising a first steering shaft and a first protective jacket sleeved on the first steering shaft;

a drive component comprising a drive bracket disposed on an outer wall of the first protective jacket, wherein a main body of the drive bracket is provided with a first energy absorption slot extending in an axial direction;

an energy absorption component comprising a first bolt passing through the first energy absorption slot and extending into the first protective jacket, wherein the first bolt is fixedly connected to the first protective jacket and in a sliding fit with the first energy absorption slot;

when in a use stage, the first bolt is maintained at a head end of the first energy absorption slot, and the drive component is capable of driving the telescopic component to expand and contract through the drive bracket;

when in a collapse and energy absorption stage, the telescopic component collapses and drives at least the first bolt to slide in the first energy absorption slot;

a second steering shaft, wherein a tail end of the first steering shaft is slidably sleeved on a head end of the second steering shaft;

a second protective jacket provided outside the second steering shaft; and wherein a drive motor of the drive component is connected to the second protective jacket, and the drive motor is connected to the drive bracket through a drive shaft.

8. An electric power steering system, comprising the electrically adjustable steering column according to any one of claims 1-2 and 3-7.

\* \* \* \* \*